United States Patent Office 3,792,059
Patented Feb. 12, 1974

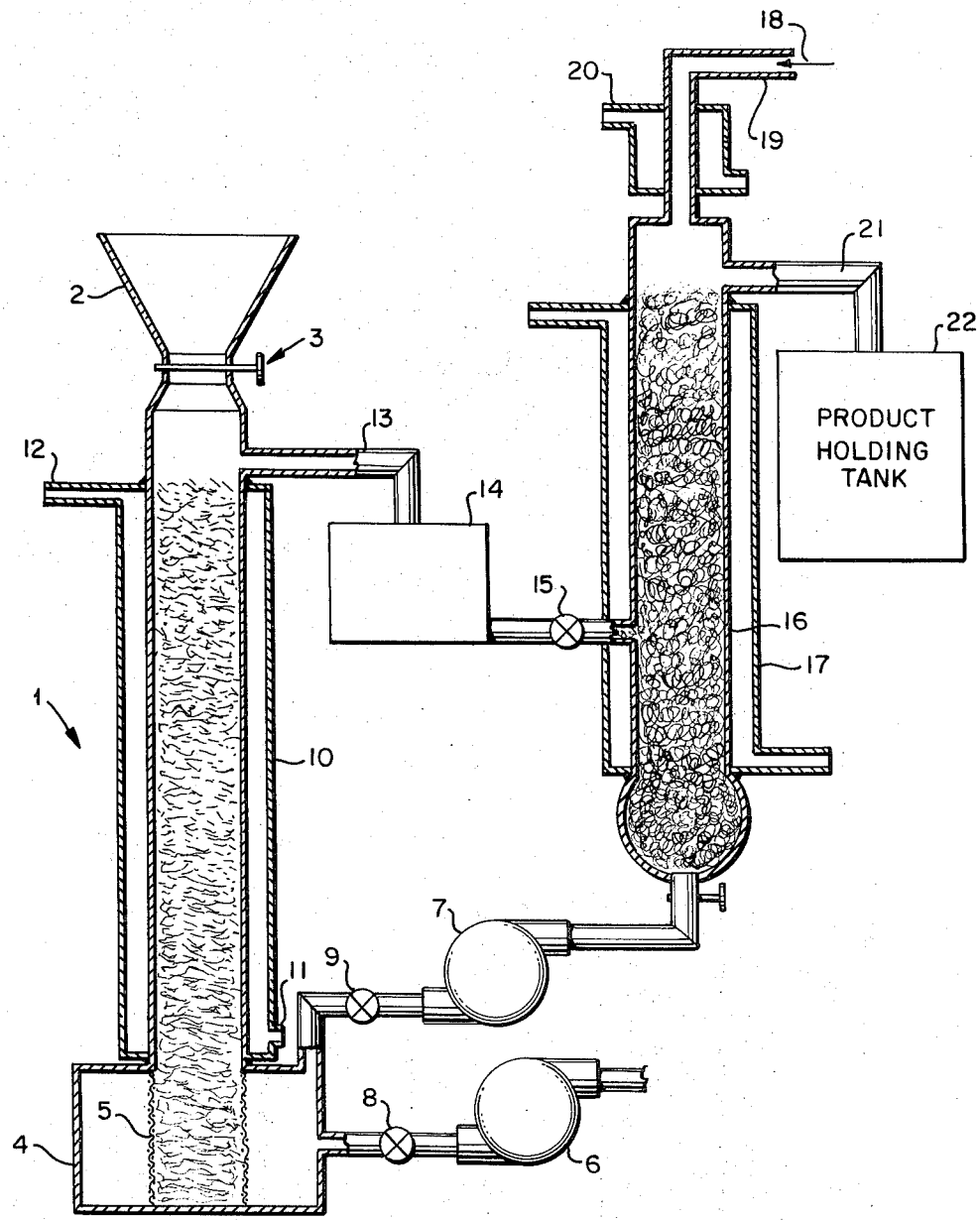

3,792,059
CONTINUOUS PROCESS OF PRODUCING NON-AROMATIC TIN HALIDES THE ORGANIC GROUP HAVING NOT MORE THAN FIVE CARBON ATOMS
Ingenuin Hechenbleikner, West Cornwall, Conn., assignor to Weston Chemical Corp., Division of Borg Warner Corp., Chicago, Ill.
Filed Feb. 24, 1972, Ser. No. 228,831
Int. Cl. C07f 7/22
U.S. Cl. 260—429.7
12 Claims

ABSTRACT OF THE DISCLOSURE

A continuous process of producing non-aromatic tin halides of not more than five carbon atoms in each organic group, such as alkyltin halides. To simplify the abstract, references will be made to the preferred alkyltin halides. In the process two columns are used. In the first, metallic tin with a large surface, such as tin granules, foil and the like, moves down through the column with a liquid catalyst which is an onium compound prepared by complexing trivalent nitrogen compounds or phosphorus compounds with alkyl halides. At the bottom of the tower alkyl halides are pumped in and flow up, reacting with the tin to form alkyltin compounds, which leave the top of the column and are separated from the onium catalyst by fractional distillation in a second column. The catalyst, carrying dissolved or complexed a small amount of alkyltin halide, is recirculated. There are two variants, one in which the catalyst consists of the onium compound only and the second where there is also present an iodine compound. Without the iodine compound the reaction is somewhat slower, but the cost of the iodine compound is eliminated, so that the choice is an economic one. In both cases the yields of alkyltin compounds are very high and often approach quantitative. The tin compounds are mixtures of monoalkyltin trihalides, dialkyltin dihalides, trialkyltin halides, and tetraalkyltin. The relative proportions of each type of product depends upon the type of catalyst, the temperature of the reaction, and the rate of flow through the apparatus. Under usual conditions, the main product will be dialkyltin dihalides.

BACKGROUND OF THE INVENTION

Alkyltin halides have been prepared by reacting tin with alkyl halides in the presence of various catalysts. With most types of catalysts the yields leave much to be desired, but there has been developed a batch process using a new form of catalyst which is an onium compound made by reacting an alkyl halide and a trivalent nitrogen compound or a similar phosphorus compound together with an iodine-containing compound. When the onium compound contains iodine as its halide, physically it is not necessary to have two separate compounds for the catalyst as the onium compound with its iodine content performs the dual function. However, in both cases there must be present the onium compound and iodine. Very high yields are obtained, but the process is still a batch process, with the accompanying higher equipment and operating costs and/or reduced outputs. The process just described is the subject matter of Canadian Pat. 785,318 to the Nitto Chemical Industrial Company, Ltd., of Japan. The catalyst, either two compounds, namely an iodine compound and an onium compound or the iodine-containing onium compound, is set forth on pages 5 to 9 of the Canadian patent to which reference is made and which is intended to be incorporated in the specification of the present application. It will be noted that in the Canadian patent there is no sharp limit on the number of carbon atoms in the alkyl halide used and very long chain compounds and aromatic and similar ring compounds are included and described more specifically in the 70 examples of the Canadian patent. The amount of the catalyst used in the Canadian compound is small, in other words, true catalytic amount, and for some of the catalysts may be in as large a range as from 0.001 to 0.5 mole per gram atom of tin metal, through larger amounts, for example 0.03 to 0.3 moles, are preferred particularly when the alkyl halide is an alkyl chloride. In the pages of the Canadian patent referred to above and to which reference is made in the present specification, the catalyst is described in terms of the trivalent nitrogen or the phosphorus compound which is initially added. However, they all react with the alkyl halide to form the onium compound, which is a quaternary compound in the case of trivalent nitrogen compounds or the corresponding higher valence for the phosphonium compounds.

Another patent describing batch processes for making alkyltin halides with onium catalyst and with recycling of catalyst is described in the Molt and Hechenbleikner Pat. 3,519,665, July 7, 1970. The description is essentially similar to that of the Canadian patent but less extensive.

SUMMARY OF THE INVENTION

The present invention is directed to a continuous process of producing non-aromatic tin halides with not more than five carbon atoms in each organic group. The most important type of product is an alkyltin halide, but in its broadest aspect the invention is not limited to organotin halides in which the organic groups are alkyl groups. The limitation to a maximum of five carbon atoms in the organic group still holds and they must be non-aromatic. Typical compounds are produced by reaction with such organic halides as epichlor halides, tetrahydrofurfuryl halides, cyanoalkyl halides, allyl halides, cyclic ether halides such as oxetane halides, and the like. The halides are active halides and so do not include fluorides. Iodides are included, but in the final product are not preferred because of the high cost of iodine and the fact that for most purposes, such as polyvinyl chloride stabilizers, the much more economical chlorides and bromides are just as effective. As is common in the art, the term "active halide" is used to exclude fluorides. In one variant it is a pure improvement on the process of the Canadian patent above referred to. In another variant the catalyst is somewhat different as the iodine compound is eliminated.

Essentially, the continuous process involves two elongated reactors, which will be referred to as columns even though the first reactor does not have some of the structural features of a fractional distillation column. The second reactor is a true column and effects a fractional distillation or separation. In the first or reactor column the column is filled with metallic tin having a large surface, such as, for example, tin granules, tin flakes, tin foil and the like. The column is then filled with liquid catalyst, that is to say, the portion of the column which is not occupied by the filling of metallic tin is filled with this liquid, which of course amounts to a small fraction of total column volume. This sets the first of two limitations on the Canadian patent in the variant in which the catalyst contains both iodine and onium compounds. This first limitation is that the reaction temperature is above 100° C. and preferably from 150° C. to just under 200° C., which constitutes the temperature at which decomposition of the more stable organotin halides takes place. Some of the less stable halides, such as allyl halides, are preferably reacted at temperatures nearer the lower end of the range. As the first column is maintained at such an elevated temperature, many of the onium compounds of nitrogen and phosphorus which might be solid at room temperature are liquid. It is essential that at the operating temperature the catalyst must be a liquid, for reasons which will be set out below. As the range of temperatures is substantial, certain onium compounds are useful at the higher parts of the range, whereas at the lowest parts of the temperature range they may no longer be liquid.

The non-aromatic organic halide which is to react with the metallic tin is also subject to a very definite limitation, namely that the organic groups do not have more than five carbon atoms. In order to simplify the following portions of the specification, the description will be in terms of producing the preferred alkyltin halide, but of course the invention includes compounds of the other non-aromatic organic groups. The limitation on the number of carbon atoms results in excluding a number of the long-chain halides which are useful in the batch process of the Canadian patent and also nearly all of the cyclic halides. The reason for the sharp limitation on the size of alkyl groups is not because alkyl halides having more carbon atoms in the organic groups would not react with metallic tin in the column but because, as will be pointed out below, separation of alkyltin halide from onium catalysts is effected in a second column by fractional distillation, the alkyltin halides having much higher vapor pressures than the onium catalyst liquids. This limitation is not a serious one practically because, at present at least, the alkyltin halides or their derivatives which are of commercial importance do not extend beyond four or five carbon atoms. If longer chain or higher molecular alkyl groups are desired or if uses for such compounds or their derivatives should develop in the future, the compounds are not practically producible by the present continuous process. About the largest alkyl group which is of commercial importance is butyl as the important polyvinyl chloride stabilizers and antifouling compounds are butyltin compounds.

The alkyl halide is pumped into the bottom of the first column and as it rises reacts with the metallic tin, and also forms with the trivalent nitrogen compounds or corresponding valent phosphorus compounds the onium catalyst, which may contain or may have added an iodine-containing compound for the variant of the present invention in which the same catalysts as described in the Canadian patent are used. At the start of operation, of course, the components of the catalyst are introduced into the metallic-tin-filled column in the form of their trivalent nitrogen or corresponding phosphorus compounds. As the alkyl halide reacts, all of the nitrogen or phosphorus compounds are transformed into the onium compound of the catalyst, and the alkyltin produced together with the much smaller amounts of onium compound catalyst leave the top of the tower. This is a steady state situation, and thereafter, as long as the process is being operated, the catalyst in the first column is always in the onium form and, as has been pointed out above, must be liquid at the reaction temperature. Metallic tin is added continuously at the top of the column, and in effect the raw materials in the continuous process are the alkyl halides and the metallic tin. By the time the alkyl halide introduced in the bottom of a column has reached the top of the column, all of it will have reacted, so that the liquid leaving the top of the first column is practically free of any alkyl halide. Because of the difference in specific gravity, it is also practically free of metallic tin. If any minute amounts of microscopically fine tin particles are mechanically carried over, they are recycled with the onium catalyst which separates out in the second column as will be described. In practice, no metallic tin at all will leave the top of the first column. The top of the first column will always have tin in large excess over the alkyl halide which remains unreacted because fresh metallic tin is being continuously added to the top of the column. This is why practically no alkyl halide leaves the top of the first column.

The mixture of onium catalyst and alkyltin halide leaving the top of the reaction column passes into a fractional distillation column of standard design. In the specific description of drawings which will follow in a later section of this specification a packed column will be shown as this is essentially a semi-diagrammatic representation, but of course other well known fractionating columns, such as plate columns with bubble caps and the like, may be used.

The fractionating column is maintained at temperatures comparable to those in the first column. A very suitable operating condition is a temperature of about 180° C. under a pressure of 10 mm. Other temperatures, even as low as about 100° C., may be used, and somewhat higher temperatures may also be used, but at about 200° C. even the more stable alkyltin halides tend to decompose and so the temperature of fractional distillation should be kept below the decomposition temperature of the alkyltin halide. As in all fractional distillation columns, a high-boiling liquid leaves the bottom and a lower boiling vapor leaves the top. The vapor is practically pure alkyltin halide and is condensed to a liquid in a conventional condenser, the details of which form no part of the present invention. The liquid leaving the bottom of the fractionating column is composed of the liquid onium catalyst, in which there is dissolved a small amount of the alkytin halide produced, and of course any small traces of metallic tin which may be carried over mechanically. This liquid from the fractionating column is pumped into the bottom of the first or reactor column together with fresh alkyl halide and constitutes a circulating load. Of course any traces of metallic tin react in the reacting column as well as the metallic tin which packs the column and so are not a pure circulating load as is the case with the onium catalyst.

Reference has been made to columns which have been described, as is common and customary for columns, in terms of top and bottom. Particularly in the case of the reactor column, the orientation of the column is not critical; it could even be horizontal, but a vertical or substantially vertical column has advantages as this column is preferably operated under sufficient super-atmospheric pressure to prevent geyser action of alkyl halide introduced in the bottom of the column, which can become vaporized at lower pressures. In a horizontal column some back pressure producing means would be necessary, and therefore, although the invention is not limited thereto in its broadest aspects, a substantially vertical reactor column presents real operating advantages and is, therefore, preferred. The second or fractional distillation column, which is often operated at sub-atmospheric pressure to permit distilling off alkyltin halides at a sufficiently low temperature so that they do not decompose, is not limited to a vertical column, though again here the vertical column has practical operating advantages and is preferred but in no sense essential.

The reactor column is quite high or long, for example 20 feet or more. Thus, as will be described in more specific descriptions below, a large laboratory or small pilot-plant column may have one inch diameter and 20 feet length. For very large production, of course, larger diameter columns can be used, but very short columns are ordinarily not desirable since the reaction, while reasonably rapid as organic chemical reactions go, still takes a finite time and residence times are normally of the order of one or several hours. Of course the fractional distillation column in which the alkyltin halide is separated from the onium catalyst should be suitably proportioned in the light of the rate of production in the reaction column.

While in steady state operation normally practically all of the alkyl halide pumped in reacts with tin before the liquids leave the top of the reaction column, it is an advantage that this is not sharply critical. If a small amount of alkyl halide remains unreacted, which is more apt to be the case with very volatile alkyl halides, such as methyl chloride, this passes over into the distillation column and leaves with the vapors of the alkyltin halide, from which it can be readily separated, for example by condensing first at a temperature somewhat above ambient at which the alkyltin halide condenses completely but which is sufficiently high under the pressure existing, which may be ambient pressure, small amounts of alkyl halide separate out and can then be condensed at a still lower pressure. Of course any alkyl halide that is so condensed is recycled. With the tall columns giving relatively long residence time, the amount of unreacted alkyl halide is very small or with some alkyl halides may actually be zero. The main advantage is in lack of criticality of operating conditions.

The second variant of the present invention, which eliminates any iodine-containing compound from the onium catalyst, results in slower reaction but not significantly different high overall yields. It is relatively easy and not too expensive to provide for a longer residence time by a higher reactor column. This is particularly true because the reactor column is of the simplest structure and is essentially only a cylinder with a metallic tin feed hopper at the top. Packing or plate construction, which adds to expense, is not present, and so the second variant constitutes a practical commercial process. It should be noted also that where the onium catalyst also contains an alkyl iodide as the iodine-containing compound, this tends to react rapidly with metallic tin; and hence, if it is desired to produce an alkyltin chloride or bromide without contamination with iodine, the variant which uses an onium catalyst only presents the advantage of pure alkyltin chloride or bromide. Also, when iodine-containing compounds are present, a considerable loss of iodine can result, and as iodine-containing compounds are much more expensive than the corresponding chlorine and bromine compounds, this cost is not insignificant.

The steady state continuous process of the present invention reduces to a minimum catalyst losses, and so makeup catalyst amounts are kept very low. The difficulty of separation of catalyst and alkyltin halide in the batch processes of the Canadian and U.S. patents also adds to the cost of these processes in addition to the much greater equipment and operating costs, and sometimes losses of catalyst, or iodine content of catalyst, is substantially greater in a batch process, and so in this respect also the present invention produces a more economical commercial process.

In the case of the batch processes described in the Canadian patent, as iodine is always present the alkyltin halides are often iodides because the reaction rate where the alkyl halide is an iodide is quite substantially greater than with chlorides and bromides. In batch processes, where speed of reaction is more important in order to save on the large operating costs, often the alkyltin halide produced is the iodide. In the present process where residence time is easily provided by tall columns, the process is relatively more economical with chlorides and bromides, and when the corresponding alkyltin halide is to be produced the savings in operating cost of the continuous process of the present invention are more important with alkyltin chlorides and bromides, and so the production of such compounds is a preferred field for the present invention, although of course the production of alkyltin iodide is in no sense excluded from broader aspects of the present invention.

It will be noted that the present invention permits a sufficiently long residence time in the first or reactor column to carry the reaction substantially to completion. On the other hand, the second column, which is a separating column, operates under substantially flash distillation conditions. Neither liquid organotin compounds nor liquid halides remain in the column for any significant time. This is of importance because decomposition of organotin halides or of the halides used in producing them is a matter of time and temperature while they are in the liquid state. The substantially flash distillation conditions keeps the time of residence extremely low, so that even quite unstable compounds, such as allyltin halide, are not decomposed to any significant degree. This is in marked contrast to the long residence time in the liquid form in batch processes, such as is the case in the Canadian patent. This is not to say that the Canadian patent is inoperative, as with quite stable halides or organotin halides practically useful yields can be obtained. However, the present process with the very short residence time in the liquid stage in the distillation column keeps decomposition so low as to be negligible even with fairly unstable products, though, as has been pointed out above, with the more unstable halides somewhat lower temperatures in the reaction column where residence time is longer are preferable.

While the present continuous process represents an important saving for lower alkyltin halides, this is not to say that even in this field the batch process of the Canadian patent is not useful, much less that it is not operative. With higher molecular alkyltin halides or tin halides with other higher molecular substituents, such as cycloalkyl, aromatic, etc., the present process is not suitable, and when these products are desired the batch process of the Canadian patent is the only useful one. However, the restriction of the present invention to lower alkyltin halide production is not a serious commercial drawback because by far the most extensive uses of alkyltin halides are with the lower alkyltin halides, and therefore the present invention with its marked savings in operating cost and large output is important in the largest commercial field of organotin halides. Since the present invention has for its major novelty the continuous process for producing lower alkyltin halides and can use any of the onium catalysts, with or without iodine-containing compounds of the Canadian patent, so long as these catalysts are liquid at reaction temperature, the nature of the catalyst itself is not what distinguishes the present invention from the prior art, except of course for the variant which eliminates iodine-containing compounds. Accordingly, in the more specific description of preferred embodiments a modest number of typical examples are set forth in order not to confuse the specification by including an enormous number of examples, such as the 70 examples of the Canadian patent which describe a very large number of the onium catalysts. Of course the examples are only typical illustrative examples and others of the onium catalyst of suitable liquidity which are set forth in the Canadian patent may be used in the present invention.

BRIEF DESCRIPTION OF THE DRAWINGS IN CONNECTION WITH THE PREFERRED EMBODIMENTS

The drawing is a diagrammatic representation showing a jacketed reaction column 1 with a tin feed hopper 2 with a feed mechanism 3 providing adjustable rate of tin feed. Such feed mechanisms are conventional for solids and therefore the indication is purely diagrammatical and the usual slow drive of the feeder is not shown. It is, of course, possible to operate the feeder 3 manually if desired. In the bottom 4 of the column where, as is shown, tin packing is held in perforated section 5, alkyl halide is pumped in by the pump 6 and recycled catalyst by the pump 7. If desired, fine control of these feeds can be effected by the throttling valves 8 and 9 in the conduits to the bottom portion 4 of the reactor column. It can be seen from the drawing that the flow of alkyl halide is countercurrent to the movement of metallic tin down the reactor.

The column 1 is shown diagrammatically with a heating jacket 10 in which any heating fluid may be used. As such jacketed columns are conventional, the mechanism for circulating heating fluid is not shown but merely an inlet 11 and an outlet 12.

From the top of the column 1 a conduit 13 leads to a surge tank 14 which receives the liquid onium catalyst, thhe liquid lower alkyltin halide, and any minor contaminants, such as small amounts of metallic tin, unreacted alkyl halide and the like. From the surge tank 14 the liquid is transferred through the valved conduit 15 into a conventional fractional distillation column 16, which is shown diagrammatically as a packed column. This column is heated by a jacket 17 in the conventional manner, and as in the case of the jacket 10 of the reactor column, circulation mechanism for the jacket fluid is not shown. The fractionating column is heated to the desired temperature, which will be set out below in examples, and the column is operated under a suitable vacuum through a conduit 18 to a source of vacuum (not shown). A condenser 19 for condensing any volatile vapors, such as small amounts of unreacted alkyl halide, which then flow back into the column 16, is of conventional water-cooled design, the water-cooling jacket 20 being shown diagrammatically.

From the top of the column 16 liquid lower alkyltin halide and any small amounts of unreacted alkyl halide pass out through the conduit 21 into a product holding tank 22. If there is any unreacted alkyl halide this can easily be separated from the lower alkyltin halide tank 22 by conventional stripping, which is not shown in order not to confuse the drawing. Of course stripped alkyl halide would return to the main alkyl halide source and be pumped by the pump 6 back through the column 1.

Jacketed columns are shown and are very suitable for the present invention, which, however, is not limited to this conventional design, and other heated columns, such as columns with electric heaters, may be used. The present invention is a process invention, although it must be operated in suitable equipment. Although the elements of the equipment are not themselves individually new, they are combined together to constitute a narrower apparatus invention which is also included.

The preferred embodiments of the present invention will be further described in conjunction with the following examples, which are typical. Parts are by weight unless otherwise specified.

EXAMPLE 1

A stainless steel column 20 feet high and one inch in diameter was packed with granular tin and the small spaces between tin granules filled with tributylmethylphosphonium iodide. The column was heated to 150° C. by electrical heaters. In the bottom of the column there was introduced methyl chloride at the rate of 2 kilograms per hour. The methyl chloride and liquid onium catalyst rose slowly through the column. The mixture of the liquid onium catalyst and methyltin chloride was passed into a distillation column, which was maintained at 180° C. and 10 mm. pressure, the methyltin chloride being separated from the onium catalyst, which was continuously pumped back into the bottom of the first column. The catalyst, containing some complexed methyltin chloride, together with about 5 kilograms of mixed methyltin chlorides, after one hour of operation were introduced into a fractional ditsillation column maintained at about 180° C. under 10 mm. pressure. The methyltin chlorides, having a higher vapor pressure than the liquid onium catalyst, were separated therefrom and the residue continuously returned to the bottom of the reactor column. After 5 hours of operation the process became steady and essentially all of the methyl chloride introduced was converted into volatile methyltin compounds, predominantly dimethyltin dicholride. During the operation fresh tin was introduced continuously at the top of the column in amounts corresponding to the introduction of methyl chloride so that the column remained substantially fully packed with metallic tin. Small additions of onium catalyst were supplied as a makeup to replace the minute losses of the catalyst. The yield based on tin after steady state had been established was substantially quantitative.

EXAMPLE 2

The procedure of Example 1 was repeated replacing the methyl chloride with a stoichiometrically equivalent amount of ethyl chloride. The onium catalyst was initially formed by adding a mixture of potassium iodide and triphenylphosphine in equimolar ratio. The phenylphosphonium catalyst produced was recycled as such. Yields of ethyltin chloride were substantially the same as in Example 1.

EXAMPLE 3

The procedure of Example 1 was repeated replacing the methyl chloride with a stoichiometrically equivalent amount of propyl bromide and using as an onium catalyst triethylpropylammonium iodide.

Yields of the propyltin chlorides were substantially the same as in Example 1.

EXAMPLE 4

The procedure of Example 1 was repeated replacing the methyl chloride with an equivalent amount of isobutyl chloride and using as the onium catalyst tetrabutylphosphonium chloride. The temperature was slightly higher than in Example 1, being about 160° C. Yields were substantially the same as in Example 1.

EXAMPLE 5

The procedure of Example 1 was followed, replacing methyl chloride with allyl chloride. The catalyst was triethylamine with an equivalent amount of allyl iodide. The temperature of the reaction was 100° C. and the product was stripped at 1 mm. pressure. Yields were substantially similar to those of Example 1.

EXAMPLE 6

The procedure was essentially similar to that of Example 1. The catalyst was tributylmethylphosphonium chloride and the reaction temperature was 180° C. The feed rate was lowered to one-half the usual rate for the column described; that is, 1 kg. per hour. The yield was substantially equal to that in Example 1.

EXAMPLE 7

The procedure of Example 1 was followed except that the methyl chloride was replaced by an equal molar quantity of epichlorhydrin. The temperature of the reaction was regulated at 120°–130° C., which lower temperature is useful due to the enhanced reactivity of the epichlorhydrin. The product, bis-epoxymethyltindichloride, was stripped at a pressure of about 1 mm. of mercury. The catalyst used was, of course, the same as in Example 1.

I claim:

1. A continuous process for producing non-aromatic low molecular weight alkyltin compounds which comprises contacting in countercurrent an extensive surface of metallic tin with the corresponding organic active halide and an onium catalyst derived from compounds selected from the group consisting of trivalent nitrogen compounds and phosphorus compounds, the alkyl halide being circulated in countercurrent to added tin metal in a reaction zone for a residence time sufficient to react substantially all of the organic halide having not more than five carbon atoms in each organic group with the tin, the zone being maintained at a temperature from 100° C. to a temperature below that at which lower organotin halides decompose, removing a mixture of lower organotin halide liquid onium catalyst and introducing it into a fractional distillation zone maintained at temperatures below the decomposition temperature of the lower organotin halide and under a reduced pressure such that the lower organotin compound is volatile, whereby the lower organotin compound is separated from the liquid onium catalyst, recycling the separated onium catalyst together with additional lower alkyl halide and adding sufficient metallic tin to correspond stoichiometrically to the organic halide, the movement of the additional alkyl halide and the added metallic tin being countercurrent to each other.

2. A process according to claim 1 in which the onium catalyst contains iodine compounds.

3. A process according to claim 1 in which the halide is an alkyl halide and the organotin halide is an alkyltin halide.

4. A process according to claim 2 in which the halide is an alkyl halide and the organotin halide is an alkyltin halide.

5. A process according to claim 3 in which the halide is a chloride.

6. A process according to claim 4 in which the halide is a chloride.

7. A process according to claim 5 in which the alkyl halide is methyl chloride.

8. A process according to claim 6 in which the alkyl halide is methyl chloride.

9. A process according to claim 5 in which the alkyl halide is a propyl halide of the halogen selected from the group consisting of chlorine and bromine.

10. A process according to claim 6 in which the alkyl halide is a propyl halide of the halogen selected from the group consisting of chlorine and bromine.

11. A process according to claim 5 in which the halide is a butyl active halide.

12. A process according to claim 6 in which the halide is a butyl active halide.

References Cited

UNITED STATES PATENTS 3,519,665　　7/1970　　Molt et al. _____ 260—429.7

WERTEN F. W. BELLAMY, Primary Examiner